United States Patent Office 3,387,916
Patented June 11, 1968

3,387,916
HETEROPOLY ACID COLORATION
MEDIUM AND PROCESS
Ray Allen Clarke, Pitman, N.J., assignor to E. I. du Pont de Nemours and Company, Wilmington, Del., a corporation of Delaware
No Drawing. Filed June 23, 1964, Ser. No. 377,398
6 Claims. (Cl. 8—55)

ABSTRACT OF THE DISCLOSURE

The invention herein is a basic dye complex of a heteropoly acid such as phosphotungstic, phosphomolybdic, phosphotungstomolybdic, silicotungstic, silicomolybdic and silicotungstomolybdic acids mixed with .4 to 10 parts, per part of basic dye, of a long chain quaternary ammonium compound. The complexes may be mixed with urea and an aqueous thickener composition. The basic dye complex is applied to acidic fibers, such as fibers of polyesters and polyacrylonitriles with pendant acid groups.

This invention is directed to an improved composition and process for printing anionic polymeric fibers with basic dyes. Methods of printing said fibers with heteropoly acid complexes of basic dyes are described in copending (common assignee) application Ser. No. 331,104, filed Dec. 17, 1963 now abandoned.

The anionic polymeric fibers utilized in the practice of this invention include such synthetic fibers as the acid-modified polyacrylic fibers described in U.S. Patents 2,837,500 and 2,837,501, and the acid-modified polyester fibers described in U.S. Patent 3,018,272. Other fibers which contain acidic sites that attract basic dyes may also be colored by the process of the present invention. The basic dyes employed as starting materials in this novel process of coloration include all dyes that are sufficiently basic to form water-insoluble complexes (sometimes called salts or lakes) with heteropoly acids such as phosphomolybdic acid and others as illustrated hereinafter. The basic dyes which are useful in the present invention, therefore, include a wide range of diverse chemical types some of which are commonly referred to as cationic dyes while others are basic dyes which behave as cationic chromophores in acidic aqueous media. The heteropoly acids are selected from members of the group consisting of phosphotungstic, phosphomolybdic, phosphotungstomolybdic, silicotungstic, silicomolybdic and silicotungstomolybdic acids.

The basic dyes which are suitable for reaction with heteropoly acids to form the water-insoluble complexes employed in the present novel process include the following: diphenylmethanes (ketone imines) such as auramine; triarylmethane dyes such as C.I. Basic Green 1, C.I. 42,040, fuchsine (C.I. 42,500), resorcine violet (C.I. 43,520), victoria blue (C.I. 44,040), basic violet (C.I. 42,557) (Suppl.), rhoduline violet (C.I. 44,520), the basic dyes of U.S. Patent 3,021,344 (1962) to D. R. Baer; of U.S. Patent 3,032,561 (1962) to J. Pikl; of U.S. Patent 2,083,888 (1937) to Carl Winter et al.; xanthene dyes such as Pyronine G (C.I. 45,005), methylene red (C.I. 45,006), Rhodamine S (C.I. 45,050), saccharein (C.I. 45,070), Rhodamine 5G (C.I. 45,105), Rhodamine G (C.I. 45,150), Rhodamine 6G (C.I. 45,160), Rhodamine 12GM (C.I. 45,310); acridines such as Acridine Orange NO (C.I. 46,005), Diamond Phosphine GG (C.I. 46,035), Rheonine AL (C.I. 46,075); methine dyes such as basic red C.I. 48,015, basic red C.I. 48,013, basic violet C.I. 48,020, basic orange C.I. 48,035, basic yellow C.I. 48,055, basic red C.I. 48,070, basic yellow C.I. 48,060, basic yellow C.I. 48,065, basic dyes prepared from 2-methylene-1,3,3-trimethylindoline (Fischer's Base) as disclosed in U.S. Patent 2,734,901 and in "Synthetic Dyes" by Venkataraman, Academic Press Inc., New York, 1952, vol. II, p. 1174, basic methine dyes as described in U.S. Patents 2,155,459 and 2,164,793, basic azatrimethinecyanine dyes such as those disclosed by J. Voltz in Angew. Chem. (English edition) pp. 532–537, October 1962; thiazole dyes such as Thioflavine T (C.I. 49,005); indamine basic dyes such as basic green C.I. 49,405; azine dyes such as Mauve (C.I. 50,245), Safranine T (C.I. 50,240), basic violet C.I. 50,055, basic blue C.I. 50,306, Induline 6B Base (C.I. 50,400); oxazine dyes such as basic blue C.I. 51,004, Mendola's Blue C.I. 51,175, basic black C.I. 51,215; thiazine dyes such as Methylene Blue C.I. 52,015, basic green C.I. 52,020; azo dyes such as the azo-safranine dyes described in U.S. Patents 3,068,056 and 3,121,711, chryscidine C.I. 11,270, basic brown C.I. 21,010; the basic azo dyes of U.S. Patent 2,972,508 (1961) to W. Kruckenberg, et al., U.S. Patent 2,821,526, British Patent 896,681, U.S. Patents 2,965,631, 3,020,272, 3,074,926, 3,119,810, 3,033,847, 3,079,377, 2,099,525, 2,864,812, 2,864,813, 2,883,373, 2,889,315, 2,022,921, 2,238,485, 2,397,927, 2,906,747, 2,945,849, 3,096,318, 3,099,652, 3,099,653, and U.S. Ser. No. 274,338, filed Apr. 19, 1963, which was abandoned and refiled as U.S. Ser. No. 494,875, filed Oct. 11, 1965, British Patent 459,594, German Patents 1,085,276, 1,088,631 and 1,135,589, French Patents 1,271,416 and 1,295,862; anthraquinone dyes such as the basic violet mono and dicondensation products of quinizarin with 2-dimethylaminoethylamine or 3-dimethylaminopropyl-amine (U.S. Patent 2,183,652), the basic dyes disclosed in U.S. Patent 2,716,655, the basic dyes disclosed in U.S. Patent 2,153,012, the basic dyes disclosed in U.S. Patents 2,701,801 and 2,701,802, the basic dyes of U.S. Patents 2,888,467, 2,611,772, 2,737,517, 2,924,609, 3,036,078, 3,040,064 and 3,076,821; Canadian Patent 624,035; British Patents 459,594, 807,241, 824,530 and 925,111; German Patents 714,986, 1,073,129 and 1,082,916; French Patent 1,277,495 and Belgian Patent 609,667; nitro basic dyes such as those disclosed in U.S. Patent 2,834,793 and 2,834,794; and basic quinophthalone dyes such as those disclosed in U.S. Patent 3,023,212.

It is an object of the present invention to increase the rate of printing the above described dye complexes so as to increase the strength of the prints obtained in a short period of steaming such as that used in continuous processes.

It is a further object to provide a unique and novel composition to achieve the heretofore described desired process results.

These and other objects of the invention will become apparent from the following description and claims.

Although good shade and brightness of prints have been obtained by the prior processes, a method has been discovered whereby strength improvements are effected, particularly when the prints are developed by rapid ageing. It is generally understood that the process of rapid ageing involves an exposure of the printed fabric in a continuous steam ager for about 20 minutes in an essentially air-free steam atmosphere at about 218° F. (103° C.).

It has been found that rapid and complete development of basic dye prints are accomplished from the above described basic dye complexes when the development step is conducted in the presence of a long-chain alkyl quaternary ammonium compound. This discovery is indeed surprising since it is known that quaternary ammonium compounds are used as retarders to slow down the rate of dyeing anionic polymeric fibers, such as acid-modified polyester and polyacrylic fibers, with basic dyes in an aqueous dyebath. In the present invention, known quaternary ammonium "retarders" are used to speed up a particular printing operation.

More specifically, the present invention is directed to a composition and process for printing anionic polymeric fibers wherein said fibers are intimately contacted, at a pH of about 2 to 7, and at a temperature of from room temperature to 170° F. (77° C.), with a coloration medium consisting essentially of an aqueous dispersion of a printing thickener and a basic dye complexed with a heteropoly acid being selected from members of the group consisting of phosphotungstic, phosphomolybdic, phosphotungstomolybdic, silicotungstic, silicomolybdic and silicotungstomolybdic acids, and wherein color development is effected by steam ageing, the improvement which comprises developing the prints in the presence of about 0.4 to 10 parts, per part of basic dye, of a long-chain alkyl quaternary ammonium compound. Preferred process embodiments include those wherein (1) the quaternary ammonium compound is incorporated in the printing paste; (2) wherein the fiber is prereated with the long-chain alkyl quaternary ammonium compound; (3) wherein the quaternary ammonium compound is applied to the fiber after application of the printing paste and (4) wherein urea is employed as a printing assistant in the amount of about 2 to 20% by weight of the printing paste.

The novel composition comprises a basic dye complex as heretofore defined and about 0.4 to 10 parts, per part of basic dye, of a long-chain alkyl quaternary ammonium compound; a preferred composition is a printing composition comprising the colorant composition of said basic dye complex, said quaternary ammonium compound, water, a printing thickener and from about 2 to 20% urea by weight based on total weight of the printing composition.

The long-chain alkyl quaternary ammonium compounds employed in the practice of the present invention represent a wide variety of quaternary ammonium derivatives illustrated by the following types:

(1)

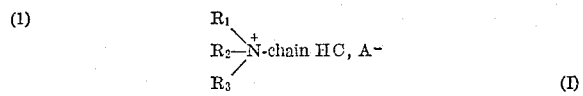

(I)

wherein $R_1$ and $R_2$ are short-chain alkyls, preferably methyl, or together with the N-atom represents a morpholine or piperidine ring; $R_3$ is a short-chain alkyl or benzyl radical, or together with $R_1$, $R_2$ and the N-atom represents a pyridine ring; "chain HC" is a $C_8$ to $C_{25}$ chain hydrocarbon radical; $A^-$ is an anion selected from the group consisting of chloride, bromide, iodide, sulfate, methosulfate, benzene-sulfonate, toluenesulfonate, phosphate or borate. Representative members of this class include the following compounds:

Cetyltrimethylammonium bromide
Lauryltrimethylammonium bromide
Benzyldimethylstearylammonium chloride
Trimethyloctylammonium chloride
Trimethyloctadecylammonium chloride
Trimethyloctadecenylammonium chloride
Trimethyloctadecadienylammonium chloride
Triethylstearylammonimum bromide, and
Diethylmethylstearylammonium methosulfate Other quaternary ammonium compounds of this class which may be used in this invention are those in the U.S. Patents 2,003,928, 2,019,124, and 2,052,612. Mixtures of the alkyl quaternary ammonium compounds may also be employed, such as those known in the trade in which the long-chain alkyl groups vary in chain length from about 8 to 25 or more C-atoms.

(2) Quaternary ammonium salts of long-chain fatty acid esters of polyalkylol alkylene diamines and of polyalkylol alkylene polyamines such as those disclosed in Canadian Patent 648,258 and in U.S. Patent 2,878,144. These quaternary compounds include those represented by the general formulas:

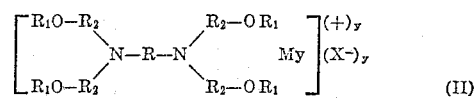

(II)

and

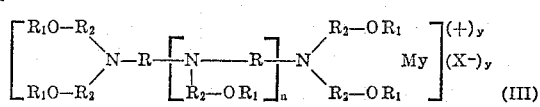

(III)

wherein R is an alkylene radical containing from 2 to 6 carbon atoms, $R_1$ is an aliphatic acyl radical containing from 12 to 18 carbon atoms or is a hydrogen atom and wherein the number of ester groups is on the average not less than about 1.5, $R_2$ is an alkylene radical of 2 to 4 carbon atoms, M is a monovalent hydrocarbon radical attached to a nitrogen atom and containing 1 to 4 carbon atoms, $X^-$ is an anion, and $y$ is an average number represented by the range 1 to 2.

The following compounds are representative members of this class:

The monoquaternary ammonium salt prepared from N,N,N',N'-tetrakis(2-hydroxypropyl)ethylenediamine dioleate and dimethyl sulfate.

The monoquaternary ammonium salt prepared from N,N,N',N'-tetrakis(2-hydroxypropyl)ethylenediamine distearate and dimethyl sulfate.

The monoquaternary ammonium salt prepared from N,N,N',N' - tetrakis(2-hydroxyethyl)propylenediamine-1,3 dilaurate and methyl iodide.

The monoquaternary ammonium salt prepared from N,N,N',N' - tetrakis(2 - hydroxyethyl)hexamethylenediamine-1,6 tristearate and dimethylsulfate.

The monoquaternary ammonium salt prepared from N - (2 - hydroxyethyl)-N,N',N'-tri(2 - hydroxypropyl)-ethylenediamine tristearate and dimethyl sulfate.

The diquaternary ammonium salt prepared from N,N,N',N'',N''-penta(2-hydroxyethyl)diethylenetriamine tetrastearate and dimethyl sulfate.

(3) Quaternary ammonium compounds as disclosed in U.S. Patents 2,129,264 and 2,199,397, which include C-substituted betaines represented by the general formula

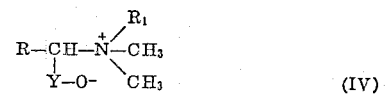

(IV)

in which R is a long-chain hydrocarbon radical containing at least 8, and preferably from 12 to 20 carbon atoms, $R_1$ is a $C_{1-4}$ alkyl, cycloalkyl or $C_{1-4}$ alkanol radical, and Y is CO or $SO_2$.

The following compounds are representative members of this class. R, $R_1$ and Y in Table I refer to Formula IV.

TABLE I

| R | $R_1$ | Y |
|---|---|---|
| $C_{17}H_{35}$ | $CH_3$ | CO |
| $C_{17}H_{35}$ | Cyclohexyl | CO |
| $C_{12}H_{25}$ | $CH_3$ | CO |
| $C_{18}H_{37}$ | $CH_3$ | $SO_2$ |
| $C_{18}H_{37}$ | $CH_2CH_2OH$ | CO |
| $C_{18}H_{37}$ | $C_4H_9$ | CO |

Likewise, mixtures of compounds may be employed such as those which contain "lorol" or "stenyl" radical mixtures as defined in column 2, page 2 of U.S. 2,129,264.
(4) Quaternary ammonium compounds as disclosed in U.S. Patent 2,129,264 which include substituted betaines represented by the general formula

wherein R is a long-chain hydrocarbon radical containing at least 8, and preferably from 12 to 20, carbon atoms, Q is a divalent radical such as $CH_2$, $CH(CH_3)$, $CH_2CH_2$, $CH_3CH_2CH_2$, and $CH_2CH(OH)CH_2$, and Y is CO or $SO_2$.

The following compounds are representative members of this class. Q, R and Y in Table II refer to Formula V.

TABLE II

| R | Q | Y |
|---|---|---|
| $C_{15}H_{37}$ | $CH_2$ | CO |
| $C_{18}H_{37}$ | $CH_2CH_2$ | $SO_2$ |
| $C_{19}H_{25}$ | $CH_2CH_2CH_2$ | CO |
| $C_{10}H_{21}$ | $CH_2CH(OH)CH_2$ | CO |

Quaternary ammonium compounds of Formula (V) wherein Y is CO and R represents a hydrocarbyl radical substituted by ether (—O—), hydroxyl (—OH) or carbonyl (—C=O—) groups, as well as the other quaternary ammonium betaines disclosed in U.S. Patent 3,027,246.

The scope of basic dyes and basic dye-heteropoly acid complexes suitable for use in the present invention are fully defined in the copending (common assignee) application Ser. No. 331,104, filed on Dec. 17, 1963, and also in the very early part of this specification.

Just as it was found to be advantageous to employ urea in printing processes of said copending application, it is also advantageous to incorporate urea or thiourea into the printing formulations of the present invention.

Although the quaternary ammonium compounds are the preferred additives for the practice of the present invention, certain tertiary nitrogen compounds also exhibit strength improvements when used in the above-described printing process, particularly when these nitrogen compounds are applied to the fiber in a prepadding operation. Such tertiary nitrogen compounds include tetramethylol urea, 5,5'-ethylene bis(tetrahydro-1,3-dimethylol-2(1H)-s-triazone), triethanolamine, N,N,N',N'-tetrakis(2-hydroxyethyl)ethylenediamine, and the like.

The selected quaternary ammonium compounds may be incorporated into the printing paste, into the fiber by a pretreatment, or they may be applied after application of the printing paste. In all three methods of operation, the prints are actually developed in the presence of said additives.

Representative examples further illustrating the present invention follow. All parts are by weight unless otherwise specified.

PART A—PREPARATION OF BASIC DYE—
HETEROPOLY ACID COMPLEXES

Example I—(a) Phosphomolybdate complex of C.I.
Basic Yellow 11, C.I. 48,055

135 parts of the yellow basic dye C.I. 48,055 are dissolved in 6,000 parts of water containing 40 parts of formic acid by heating at 80° to 85° C. A phosphomolybdic acid solution is prepared in a separate vessel by dissolving 165 parts of sodium molybdate ($Na_2MoO_4$) and 9 parts of disodium acid phosphate ($Na_2HPO_4 \cdot 7H_2O$) in 2,400 parts of water and then acidifying with 120 parts of formic acid. The light yellow colored phosphomolybdic acid solution is added to the hot dye solution until a spot test on paper shows no color bleed, indicating that the dye is completely precipitated as the phosphomolybdic acid complex. The dye slurry is heated for approximately one hour at 90° to 95° C. and then filtered. The filter cake is washed with water to remove the excess acid. The resulting filter cake of the phosphomolybdic acid complex of the dye is converted to a dispersed paste as follows: 60 parts of dispersant (the sodium salt of the condensation product of formaldehyde and 2-naphthalene sulfonic acid) are added to the wet press cake which consists of 187 parts of dye complex and 540 parts of water. A fine dispersion of the dye complex is obtained by subjecting this paste to milling action by any known conventional techniques such as a colloid mill or by stirring the paste in the presence of sand (see B. P. 435,614). The fine, dispersed paste of the phosphomolybdate complex of the dye is further protected from settling by the addition and thorough mixing of dextrin equivalent to about 10% on the weight of the paste. When a test portion of the paste product (dissolved in dimethyl formamide containing acetic acid) is compared spectrophotometrically with a like solution of the pure crystalline dye, it is found that about 6.4 parts of the paste product have the same color value as one part of the pure basic dye C. I. 48,055.

(b) Phosphotungstic acid complex of Basic Yellow
C. I. 48,055

The procedure for the preparations of the phosphotungstic acid complex of Basic Yellow 11 is like that for the phosphomolybdate in part (a) of this example except that 225 parts of sodium tungstate ($Na_2WO_4$) are used in place of the 165 parts of sodium molybdate.

(c) Phosphotungstomolybdic acid complex of
Basic Yellow C. I. 48,055

The procedure is like that in part (a) except that a mixture of 168 parts of the sodium tungstate and 72 parts of the sodium molybdate are used instead of the sodium molybdate alone. The ratio of sodium tungstate to sodium molybdate may be varied extensively.

(d) Silicomolybdic acid complex of Basic Yellow
C. I. 48,055

135 parts of Basic Yellow C. I. 48,055 are dissolved at 80° to 85° C. in 6,000 parts of water containing 40 parts of formic acid. A solution of silicomolybdic acid is prepared in a separate vessel by dissolving 156 parts of sodium molybdate ($Na_2MoO_4$) and 150 parts of a 40% solution of sodium silicate ($Na_2Si_4O_9$) in 3,000 parts of water at 90° C. 1,150 parts of 18% (by weight) sulfuric acid are added to the hot sodium molybdate-sodium silicate solution. The silicomolybdic acid solution so obtained is added to the hot dye solution to precipitate the silicomolybdate complex of the dye. The dye complex is filtered while hot and washed free of strong mineral acid with cold water. The dye complex is then dispersed and milled as described in part (a) above for the phosphomolybdate complex.

(e) Silicotungstic acid complex of Basic Yellow
C. I. 48,055

The procedure of part (d) is followed except that the 156 parts of sodium molybdate are replaced by 225 parts of sodium tungstate.

(f) Silicotungstomolybdic acid complex of Basic Yellow
C. I. 48,055

The procedure of part (d) is followed except that the solution of inorganic salts is replaced by a solution which contains 150 parts of sodium silicate (40% solution), 78 parts sodium molybdate and 112 parts of sodium tungstate in 3,000 parts of water.

Example II

Following the procedures outlined in the preceding example, in which a basic dye is precipitated from solutions with heteropoly acids followed by isolation of the resulting complexes and conversion to dispersed pastes, the basic dyes listed in the first column of Table I are converted to their complex salts and then to dispersed pastes. The heteropoly acid complexes are listed in column 2. The basic dye contents of the pastes, shown in column 3, are calculated as uncomplexed dye equivalent based on comparative dyeing strengths of the complexed and uncomplexed forms of the dyes on acid-modified polyacrylonitrile fiber. The basic dye content of the dispersed pastes varies with the amount of water present in the filter cake of the dye complex and with the complexing heteropoly acid employed.

| Ex. II | Basic Dye | Heteropolyacid Complex | Basic Dye in Dispersed Paste (percent by wt.) |
|---|---|---|---|
| (a) | C.I. 48,055 | Phosphomolybdate | 18.1 |
| (b) | C.I. 48,055 | Phosphotungstomolybdate | 11.8 |
| (c) | C.I. 48,055 | Silicomolybdate | 7.5 |
| (d) | C.I. 48,055 | Silicotungstomolybdate | 7.0 |
| (e) | C.I. 48,035 | Phosphomolybdate | 13.0 |
| (f) | U.S. 2,164,793, Ex. 1 | do | 12.5 |
| (g) | U.S. 2,164,793, Ex. 1 | Phosphotungstate | 10.7 |
| (h) | U.S. 2,164,793, Ex. 1 | Phosphotungstomolybdate | 13.0 |
| (i) | U.S. 2,164,793, Ex. 1 | Silicomolybdate | 8.3 |
| (j) | U.S. 2,164,793, Ex. 1 | Silicotungstomolybdate | 11.3 |
| (k) | U.S. 2,155,459, pg. 2, li. 26 from Fischer's aldehyde and p-anisidine. | Phosphomolybdate | 24.0 |
| (l) | U.S. 2,972,508, Ex. 16 | do | 21.7 |
| (m) | C.I. 51,004 | do | 12.5 |
| (n) | C.I. 51,004 | Phosphotungstomolybdate | 11.6 |
| (o) | C.I. 51,004 | Silicomolybdate | 5.6 |
| (p) | C.I. 51,004 | Silicotungstomolybdate | 8.4 |
| (q) | B.P. 807,241, Ex. 2 | Phosphomolybdate | 19.3 |
| (r) | B.P. 807,241, Ex. 2 | Phosphotungstomolybdate | 19.8 |
| (s) | C.I. 45,215 | Phosphomolybdate | 12.5 |
| (t) | C.I. 45,215 | Silicotungstomolybdate | 12.1 |
| (u) | U.S. 2,883,373, Ex. 1 | Phosphomolybdate | 12.8 |
| (v) | U.S. 2,883,373, Ex. 1 | Phosphotungstomolybdate | 13.2 |
| (w) | U.S. 2,883,373, Ex. 1 | Silicomolybdate | 12.5 |
| (x) | U.S. 2,864,813, Ex. 1 | Phosphomolybdate | 25.0 |
| (y) | U.S. 2,864,813, Ex. 1 | Silicotungstomolybdate | 22.7 |
| (z) | U.S. 2,889,315, No. 9 in Table of Ex. 1. | Phosphomolybdate | 11.9 |
| (aa) | U.S. 2,821,526, Ex. 13 | do | 24.8 |
| (bb) | U.S. 2,821,526, Ex. 13 | Phosphotungstomolybdate | 26.0 |
| (cc) | U.S. 2,821,526, Ex. 13 | Silicotungstomolybdate | 25.7 |
| (dd) | C.I. 48,013 | Phosphomolybdate | 12.5 |
| (ee) | C.I. 48,013 | Phosphotungstomolybdate | 13.1 |

Similarly, any of the basic dyes disclosed on pages 4 to 6, above, may be employed in the processes of Example I to provide dispersed pastes of the dye-heteropoly acid complexes. The dispersed pastes thus obtained are thin, free-flowing liquid pastes having dye-complex particles generally one micron or less in size. The pastes are readily diluted with hot or cold water and are easily incorporated into the viscous solutions or thickeners used for textile printing. In printing pastes thus obtained, the dye particles remain dispersed so that speck-free prints are produced from them, even after the printing pastes are stored for long periods. Furthermore, the dispersed basic dye complexes may be mixed with acid, direct, disperse and other dye types without danger of precipitation or incompatibility so that fabrics of mixed fiber construction which contain acid-modified fibers can be printed or dyed simultaneously with the types of dyes specifically required for the fibers present.

MODIFICATIONS AND EQUIVALENTS (1) Preparation of the basic dye-heteropoly acid complexes (Part A).

The scope of "basic dyes" which may be utilized in the practice of this invention has been described heretofore.

Processes for manufacturing the complexes are detailed in Example I. In general, the basic dye is dissolved in aqueous acidic medium and is then precipitated by an aqueous solution of heteropoly acid. Complete precipitation of dye complex by the heteropoly acid is readily determined by a spot test on paper. When precipitation is complete, there will no longer be a color bleed of the soluble dye on the paper. The isolated dye complex is preferably milled in the presence of a dispersant to provide a dispersed paste which is readily incorporated into printing formulations. The dispersed pastes may be dried and ground, if desired, for use in dyeing operations, but these additional steps are not included in the preferred mode of operation for economic reasons.

The preferred dispersants for the basic dye complexes are those of the anionic type such as the alkali metal or ammonium salts of the lignin sulfonic acids and the alkali metal, alkaline earth metal or ammonium salts of the condensation product of formaldehyde and 1- or 2-naphthalene-sulfonic acid.

It is to be understood that the various heteropoly acids may be used alone or mixed in any proportion when preparing the basic dye complexes for use in this invention.

PART B—PRINTING—Example III

A dye printing paste is prepared which contains the following ingredients:

4 parts of a dispersed paste of the phosphomolybdate complex of the red basic dye of Example 1 of U.S. 2,164,793, prepared as described in Example II–f above which is identical with Example 18–f of copending application Ser. No. 331,104, filed Dec. 17, 1963, and containing 12.5% by weight of the basic dye, 35 parts of water, 60 parts of neutralized 5% aqueous dispersion of modified Locust bean gum thickener ("Polygum" 260), and 1 part of alkyl ($C_{12-16}$) trimethylammonium bromide.

The dye paste and water are mixed and stirred into the gum thickener to obtain a smooth paste. The quaternary ammonium bromides are then incorporated into the printing paste by thorough stirring.

The printing paste thus obtained is roller printed onto separate fabrics of acid-modified acrylic fibers and acid-modified polyester fibers, respectively, and the prints are dried at 170° F. (77° C.) for two minutes in a flue dryer. The dried prints are aged in a continuous-type steam ager at 214°–220° F. (101°–104° C.) for 20 minutes. The prints are then rinsed, first in cold water, then in hot water, soaped 1 to 5 minutes at 140° F. (60° C.) in a bath containing 0.06 g./l. of surface active agent (the sodium salt of the sulfate of the condensation product of ethylene oxide and oleyl alcohol), rinsed and dried.

Strong red prints are obtained on both fibers. Prints which are considerably weaker and considerably duller than these are obtained when the above-described process is repeated, except that the quaternary ammonium bromide is omitted.

When 2 parts to 25 parts of urea are incorporated into the printing paste of the present example, and the printing operation is performed as described above, the resulting prints exhibit improved brightness, strength and penetration of the dye into the fiber as compared with the control prints which are prepared without urea.

When about 0.2–5 parts of one or a mixture of the quaternary ammonium compounds disclosed in the application are employed in the present example in lieu of the alkyl ($C_{12-16}$) trimethylammonium bromide, strong and bright red prints are obtained.

It will be understood by those skilled in the art that the printing pastes may be applied by screen printing, as well as by roller printing, also that the Locust bean gum thickener employed in the present example may be replaced in whole or in part by other thickeners, such as a 4% aqueous dispersion of sodium alginate gum ("Keltex"), or by a 4–6% aqueous dispersion of a starch thickener ("Flotex"), or by methylcellulose and the like.

In other modifications of the process of the present example, the prints may be aged in the continuous steam ager for periods of 5, 10, 15 or 30 minutes, or they may be steamed in a cottage steamer (autoclave) for 45 to 90 minutes at 0 to 5 p.s.i.g. without materially affecting the results.

In similar manner, strong and bright prints are obtained when the phosphomolybdate complex of the red basic dye used in this example is replaced by other basic dye heteropoly acid complexes, such as those disclosed in copending application Ser. No. 331,104, filed Dec. 17, 1963 as well as those disclosed in the very early part of this specification.

EXAMPLE IV—Printing

Separate fabrics of acid-modified acrylic fibers and of acid-modified polyester fibers are padded at room temperature with a 2% solution of the monoquaternary ammonium salt prepared from N,N,N′,N′-tetrakis(2-hydroxypropyl)-ethylenediamine dioleate and dimethylsulfate (see Formula II above), the pressure on the padder squeeze rolls being adjusted so that the fabric retains 60% of its weight (OWF) of said solution. The fabrics are then dried at 170° F. (77° C.) for 2 minutes in a flue dryer.

The dried fabrics thus obtained, as well as control fabrics of the same fibers (unpadded), are printed at a 40% pick-up (increase of weight in the printed area) with a dye printing paste prepared by mixing:

8 parts of a dispersed paste of the phosphomolybdate complex of the blue basic dye of C.I. 51,004, prepared as described in Example II–m above which is identical with Example 18–m of copending application Ser. No. 331,104, filed Dec. 17, 1963, and containing 12.5% by weight of the basic dye.
32 parts of water, and
60 parts of neutralized 5% aqueous dispersion of modified Locust bean gum thickener ("Polygum" 260).

The prints are dried at 170° F. (77° C.) for two minutes in a flue dryer. After ageing the dried prints in a continuous-type steam ager at 214°–220° F. (101°–104° C.) for 5 to 30 minutes, they are rinsed, soaped, rinsed and dried as described in Example III.

The prints obtained on the fabrics which had been padded with the quaternary ammonium compound were stronger and brighter than prints made on the control (unpadded) fabrics. Similar results are obtained when the quaternary ammonium salt solution concentration varies from about 0.3 to 6%. It will be obvious to one skilled in the art that the ratio of quaternary ammonium additive to dye on the fiber may also be adjusted by variations in the pick-up setting of the padder, say between 25 and 100% pick-up, and also by varying the concentration of dye in the printing paste.

Further variations may be made in the process of the present example which give similar results. These variations are noted in Example III, and include the use of urea, other quaternary ammonium compounds disclosed herein, the use of different printing thickeners, variations in the steam ageing step, and the use of a variety of basic dye heteropoly acid complexes including those disclosed in copending application Ser. No. 331,104, filed Dec. 17, 1963 and also disclosed in the very early part of this specification.

EXAMPLE V—Printing

A dye printing paste is prepared as described in Example III except that the one part of quaternary ammonium bromide is omitted and 36 parts of water are used instead of 35 parts.

The printing paste is roller printed (or screen printed) onto separate fabrics of acid-modified acrylic fibers and acid-modified polyester fibers, respectively, at a 40% pick-up (see Example IV), and the prints are dried at 170° F. (77° C.) for 2 minutes in a flue dryer. Portions of the dried prints are then over-printed at 40% pickup with a paste prepared by stirring:

1 part of hexadecyltrimethylammonium bromide and
39 parts of water into
60 parts of Locut bean gum dispersion (described in Example III).

The resulting prints are dried, as before, and then aged in a continuous-type steam ager, and finished as in Example III. The control prints, not over-printed with the quaternary ammonium bromide, are steam aged and finished in the same manner.

The prints which are developed in the presence of the quaternary ammonium bromide are much stronger and brighter than the control prints. If desired, about 2 to 25 parts of urea or thiourea may be added to either printing paste described in the present example to effect improvements in brightness and penetration. In a further modification of the present process, the dye printing paste is not dried prior to over-printing with the quaternary compound. Other variations as described in the previous examples are also applicable in the process of the present example. Strong and bright prints are also obtained in the present example when the concentration of quaternary ammonium compound in the over-print paste is varied from about 0.2 to 5%.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. A printing composition consisting essentially of (1) a basic dye complexed with a heteropoly acid selected from the group consisting of phosphotungstic, phosphomolybdic, phosphotungstomolybdic, silicotungstic, silicomolybdic and silicotungstomolybdic acids, (2) about 0.4 to 10 parts, per part of said basic dye, of a long-chain alkyl quaternary ammonium compound, (3) water, (4) a printing thickener and (5) from about 2 to 20% urea by weight based on the total weight of the printing composition.

2. In the process for printing anionic polymeric fibers wherein said fibers are intimately contacted, at a pH of about 2 to 7, and at a temperature of from room temperature to 77° C., with a coloration medium consisting essentially of an aqueous dispersion of a basic dye complexed with a heteropoly acid selected from the group consisting of phosphotungstic, phosphomolybdic, phosphotungstomolybdic, silicotungstic, silicomolybdic and silicotungstomolybdic acids, and wherein color development is effected by steam ageing, the improvement wherein said color development is conducted in the presence of about 0.4 to 10 parts, per part of said basic dye, of a long-chain alkyl quaternary ammonium compound.

3. A process according to claim 2 wherein said quaternary ammonium compound is incorporated into said coloration medium prior to said fibers being intimately contacted with said medium.

4. A process according to claim 2 wherein said quaternary ammonium compound is applied to said fibers before said fibers are intimately contacted with said coloration medium.

5. A process according to claim 2 wherein said quaternary ammonium compound is applied to said fibers after said fibers are intimately contacted with said coloration medium.

6. A process according to claim 2 wherein urea is employed in the amount of about 2 to 20% by weight of the printing paste.

References Cited
UNITED STATES PATENTS

| | | | |
|---|---|---|---|
| 1,848,589 | 3/1932 | Werdenberg | 8—30 |
| 2,192,956 | 3/1940 | Sloan et al. | 134—58 |
| 2,215,196 | 9/1940 | Schlack | 8—29 |
| 2,589,953 | 3/1952 | Miller | 8—30 |
| 2,922,690 | 1/1960 | Mueller et al. | 8—21 |
| 3,107,968 | 10/1963 | Pascal | 8—55 |
| 2,989,361 | 6/1961 | Hees | 8—55 |

OTHER REFERENCES

Diserens, L., The Chemical Technology of Dyeing and Printing, vol. II, pp. 92–94, 101, 102, pub. 1951 Reinhold Pub. Corporation, New York, N.Y.

Apps., E. A., Printing Ink Technology, pp. 147, 167, 174, 175, 392 and 541, pub. 1958 by Leonard Hill Books Ltd., London, England.

Leddy, American Dyestuff Reporter, Apr. 18, 1960., pp. 57–58 and 65–68.

NORMAN G. TORCHIN, *Primary Examiner.*

D. LEVY, *Assistant Examiner.*